(12) United States Patent
Osuka et al.

(10) Patent No.: US 6,841,964 B2
(45) Date of Patent: Jan. 11, 2005

(54) PARALLEL LINK MANIPULATOR AND ITS CONTROL DEVICE

(75) Inventors: Koichi Osuka, Kyoto (JP); Yoichi Nakamura, Nagaokakyo (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 77 days.

(21) Appl. No.: 10/418,144

(22) Filed: Apr. 18, 2003

(65) Prior Publication Data

US 2003/0197482 A1 Oct. 23, 2003

(30) Foreign Application Priority Data

Apr. 19, 2002  (JP) ........................................ 2002-117308
May 29, 2002  (JP) ........................................ 2002-155042

(51) Int. Cl.[7] .............................................. B25J 15/02
(52) U.S. Cl. ............................ 318/568.21; 318/568.11; 318/568.2; 901/32; 901/35
(58) Field of Search ...................... 318/568.21, 568.11, 318/568.2; 901/32, 35

(56) References Cited

U.S. PATENT DOCUMENTS

| | | | |
|---|---|---|---|
| 4,976,582 A | | 12/1990 | Clavel |
| 5,187,996 A | * | 2/1993 | Torii et al. ................ 74/479.01 |
| 5,276,390 A | * | 1/1994 | Fisher et al. .............. 318/568.1 |
| 5,313,854 A | * | 5/1994 | Akeel ....................... 74/490.04 |
| 6,047,610 A | * | 4/2000 | Stocco et al. ............. 74/479.01 |
| 6,339,969 B1 | * | 1/2002 | Salcudean et al. ........ 74/490.05 |
| 2004/0149065 A1 | * | 8/2004 | Moran ...................... 74/490.04 |

* cited by examiner

*Primary Examiner*—Rita Leykin
(74) *Attorney, Agent, or Firm*—Westerman, Hattori, Daniels & Adrian, LLP

(57) ABSTRACT

Then an end effecter is used to operate a heavy object, a large bending moment may act on arms of a manipulator to bend them. Consequently, an operating section cannot precisely control positions. Thus, according to the present invention, three arms 14 are attached to a base section 11, each of the arms 14 being composed of a first link section 15 having one end connected to a rotating shaft 12 on the base section 11 and a second link section 17 connected to the first link section 15 via another rotating shaft 16. These arms 14 support an operating section 19. The second link section 17 is connected to the rotating shaft 16 and to the operating section 19 using universal joints 18a and 18b. Direct acting driving means 13 is composed of a driving shaft 13a and a driving source that advances and retreats the driving shaft 13a. The driving shaft 13a is driven to advance and retreat to move the operating section 19 to a desired position. In this case, the operating section 19 is always kept parallel with a particular plane. Loads on the operating section 19 act in the axial directions of the driving shafts 13a. This prevents the driving shafts 13a from being bent or deformed, thus enabling precise positional control.

7 Claims, 17 Drawing Sheets

FIG. 2A
FIG. 2B
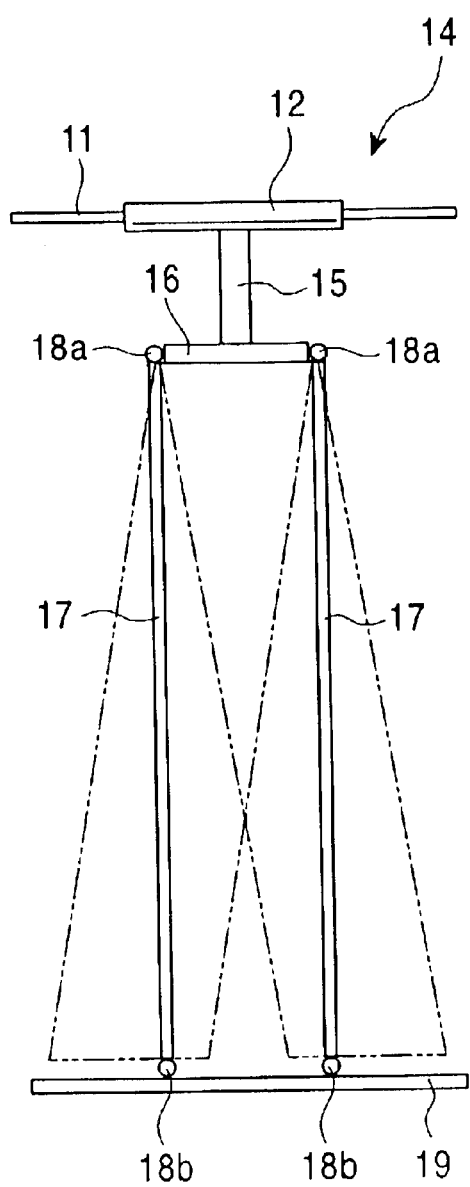
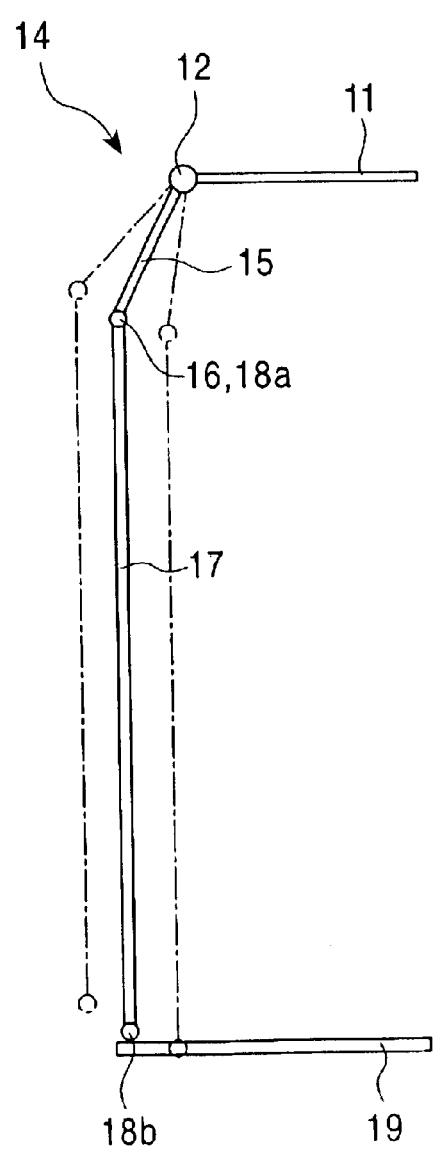

PARALLEL LINK MANIPULATOR AND ITS CONTROL DEVICE

FIELD OF THE INVENTION

The present invention relates to a manipulator that moves an end effecter while maintaining a constant posture parallel with a particular plane.

BACKGROUND OF THE INVENTION

A manipulator utilized in an industrial robot or the like determines the spatial position of an end effecter that moves, inspects, and processes an object, by controlling an arm section connected to the end effecter. It is necessary to have a high degree of freedom in order to allow the end effecter to move to an arbitrary spatial position. Among such manipulators, a so-called Stewart platform type manipulator (a degree of freedom: 6) is known in which 6 direct-acting expandable parallel link manipulators each comprising an actuator are connected to the end effecter. This manipulator has been put to practical use for machine tools.

However, if the manipulator is used for a certain operation (for example, packing, aligning, or sorting articles, loading and unloading work pieces onto and from a machine tool, or inspecting articles), the end effecter need not be rotated in a space. In this case, it is sufficient for the end effecter to be able to move in a particular planar direction and a particular height direction. That is, the manipulator has only to have a degree of freedom of 3. The Examined Japanese Patent Application Publication (Tokko-Hei) No. 4-45310 describes an example of a manipulator having a degree of freedom of 3 and which can be used for applications such as those described above.

FIG. 10 shows the principle of configuration of this conventional manipulator. This manipulator 10 is designed so that three arms 4 are attached to a base section 1 acting as a reference so that the leading ends of the three arms 4 support an end effecter 9. The arms 4 are attached so as to extend radially from the base section 1 in three directions at substantially equal angular intervals. Each arm 4 is composed of a single link section 5 having one end connected to a rotating shaft 2 provided on the base section 1 and a parallel link section 7 connected to the other end of the single link section 5 via another rotating shaft 6 and composed of two bars of the same length. Three rotating shafts 2 of the base section 1 are arranged in the same plane and are installed so that the rotating shafts 6 are parallel with the corresponding rotating shafts 2. The parallel link section 7 is connected to each of the rotating shaft 6, located at the upper end, and the end effecter 9, located at the lower end, using universal joints $8a$, $8b$ such as ball joints or Cardan joints which have a degree of freedom of 2 or more. The universal joint $8b$, which connects the leading end of the parallel link section 7 of each of the three arms 4 to the end effecter 9, is arranged in the same plane (hereinafter referred to as the "particular plane"). Driving means 3 such as a servo motor is connected to each of the rotating shaft 2, provided on the base section 1, in order to rotationally drive the rotating shaft 2 around its axis.

In the manipulator 10, configured as previously described, the single link section 5 can be rotationally moved integrally with the rotating shaft 2 of the base section 1 around the axis of rotating shaft 2. The single link section 5 and the parallel link section 7 rotationally move around the axis of the rotating shaft 6 so as to change the angle between the single link section 5 and the parallel link section 7. Furthermore, the parallel link section 7 can be rotationally moved around the universal joint 8 relative to the rotating shaft 6, located at the upper end of the manipulator, and the end effecter 9, located at the lower end of the manipulator. Accordingly, by using the driving means 3 to rotationally drive the three rotating shafts 2 of the base section 1, the postures of the three arms 4 can be controlled to move the end effecter 9 to a desired position. In this regard, owing to the organizational characteristics of the parallel link section 7, whatever posture the parallel link section 7 assumes, the universal joint $8b$, located at the lower end, maintains a posture parallel with the rotating shaft 6, located at the upper end. Thus, the end effecter 9, supported at the leading ends of the three arms 4 always maintains a posture parallel with the particular plane when its position is changed by changing the postures of the arms 4. That is, the manipulator 10 can be moved to an arbitrary position while always keeping the end effecter 4 parallel with the particular plane.

The conventional manipulator 10 uses the mechanism in which the load of the entire arm 4 is supported by the rotating shaft 2, located at the proximal end of the arm 4, and in which the rotating shaft 2 is rotationally driven to control the posture of the arm 4. Thus, disadvantageously, the single link section 5 and parallel link section 7, constituting the arm 4, undergo heavy loads. For example, it is assumed that an article is transferred by installing an appropriate task device on the end effecter 9. Then, when the driving means 3 rotationally drives the rotating shaft 2 in order to transfer an article, a large bending moment acts on the link members of the single link section 5 and parallel link section 7 because the postures of the arms 4 are changed while the load of the article gripped by the end effecter 9 is acting on the arms 4. As a result, deformation such as bending occurs in the link members, thus hindering the article from being transferred to an exact position. Further, the life expectancy of the link members is shortened. These disadvantages are more marked as the load of the article to be handled increases. Consequently, it has hitherto been difficult to efficiently and accurately transfer heavy articles.

The parallel link manipulator is a mechanism in which an end effecter such as a motion base is connected to a fixed base using a plurality of parallel links. Some of the joints used in the parallel link manipulator are driven joints, while the others are driving joints. It is expected that the parallel link manipulator enables rigid and accurate linear high-speed movement from the current position to a target position, which movement is difficult to achieve with conventional serial mechanisms. However, since the parallel mechanism has the driven joints, forward kinematic calculations are difficult. Accordingly, in most cases, control using task coordinate variables is not carried out. This is particularly because an inverse matrix $J^{-1}$ of a Jacobian matrix J is required to convert driving joint coordinate variables into estimated values for task coordinate variables. As is well known, the elements of the Jacobian matrix are not constants but functions of the task coordinate variable. It is thus a heavy mathematical burden to evaluate the values of the inverse matrix in connection with the respective values of the task coordinate variables. Such a mathematical burden may hinder the parallel mechanism from being put to practical use.

It is a basic object to eliminate the need for the inverse matrix $J^{-1}$ of the Jacobian matrix in determining task coordinate variables. An additional object of aspect of the invention set forth in claim 6 is to eliminate the need for an inverse matrix $J^{-T}$ of a transposed matrix of the Jacobian matrix in providing feedback to driving joints. An additional object of aspect of the invention set forth in Claim 7 is to provide a parallel mechanism that can rigidly move an end effecter while maintaining a constant posture of the end effecter.

SUMMARY OF THE INVENTION

A parallel link manipulator according to the present invention has been created to solve the previously described conventional problems. According to the present invention, there is provided a parallel link manipulator having an auxiliary mechanism configured to always keep a posture of an end effecter parallel with a particular plane, the manipulator being characterized by being provided with at least three direct-acting driving means each composed of a driving shaft having a supported proximal side and a leading side connected to the end effecter using a pivoting bearing with a degree of freedom of 2 or more, and a driving source which advances and retreats the driving shaft toward and from a proximal support point.

In the manipulator configured as described above, besides the auxiliary mechanism that regulates the posture of the end effecter so that it remains parallel with the particular plane, the direct-acting driving means for controlling the position of the end effecter is independently provided so that loads on the direct-acting driving means act in the axial direction of the driving shaft. Accordingly, even if the end effecter performs an operation of handling a heavy object, the driving shaft of the driving means is prevented from being bent or deformed by loads. This improves the positional control of the end effecter. In this regard, three or more direct acting activating means are required to move the end effecter to an arbitrary position in the plane.

The auxiliary mechanism used to always keep the posture of the end effecter parallel with the particular plane may be provided with at least two arms each composed of a first link section having one end attached to a rotating shaft installed on a base section and having a degree of freedom of 1 and a second link member composed of two or more parallel link members each having opposite ends connected to the other end of the first link section and to the end effecter, respectively, using pivoting bearings with a degree of freedom of 2 or more.

Further, it is contemplated that the direct-acting driving means may be configured to advance and retreat the driving shaft through and from a nut member by using the driving source to rotationally drive the driving shaft or nut member, the nut member being attached to the base section using the pivoting bearing with a degree of freedom of 2 or more, a threaded portion formed in a surface of the driving shaft being screwed into the nut member.

Alternatively, it is possible that the direct-acting driving means is composed of a cylinder mechanism having opposite ends connected to the end effecter and to the base section, respectively, using the pivoting bearings with a degree of freedom of 2 or more, the cylinder mechanism being driven by fluid pressure so as to be expanded and contracted.

According to the present invention, there is provided a control device for a parallel link manipulator which moves an end effecter using a plurality of driving joints and a plurality of driven joints, the control device comprising inverse kinematic converting means for converting estimated values for task coordinate variables for the end effecter into estimated values for driving joint coordinate variables, forward kinematic converting means for updating the estimated values for the task coordinate variables so as to avoid deviations between the estimated driving joint coordinate variables and actual driving joint coordinate variables, and control means for providing feedback control to the driving joints so as to match target task coordinate variables with the estimated values for the task coordinate variables, the control device being characterized in that the forward kinematic converting means updates the estimated values of the task coordinate variables by multiplying the deviations by a transposed matrix of a Jacobian matrix and a gain and integrating products obtained, the transposed matrix being used to convert a differentiation of the task coordinate variables into a differentiation of the driving joint coordinate variables.

Preferably, the control means multiplies the deviations between the target task coordinate variables and the estimated values of the task coordinate variables by the Jacobian matrix and gain to determine controlled variables for the driving joints.

More preferably, a parallel link manipulator to be controlled is composed of a mechanism for maintaining a constant posture of the end effecter relative to a fixed base and a direct acting mechanism for changing a position of the end effecter, the direct acting mechanism being controlled as driving joints.

With the control device for the parallel manipulator according to the present invention, when forward kinematic conversion is used to determine the estimated values for the task coordinate variables from the driving joint coordinate variables, the inverse matrix of the Jacobian matrix need not be used. Instead, the transposed matrix of the Jacobian matrix may be used. The transposed matrix of the Jacobian matrix can be easily determined once the Jacobian matrix is determined. This reduces mathematical burdens in converting the driving joint coordinates into the task coordinate variables. Further, through the lemmas and simulations described in the embodiments, the inventor has confirmed that this configuration enables the task coordinate variables to be estimated.

Once the estimated values of the task coordinates are obtained and the deviations between these estimated values and the target task coordinate variables are determined, feedback must be provided to the driving joints. The inverse matrix of the transposed matrix of the Jacobian matrix is required to determine the controlled variables applied to the driving joints. However, it is a heavy mathematical burden to find the inverse matrix. Thus, according to the aspect of the invention set forth in claim 6, the controlled variables are determined by multiplying the deviations by the Jacobian matrix and the gain. This obviates the need to find the inverse matrix of transposed matrix of the Jacobian matrix. The inventor has confirmed through simulations that the parallel link manipulator can be controlled along a target locus.

BRIEF DESCRIPTION OF THE DRAWINGS

FIG. 2 is a view showing an example of configuration of an arm used for the parallel link manipulator according to the present invention, wherein FIG. 2A is a front view, and FIG. 2B is a side view.

DETAILED DESCRIPTION OF THE PREFERRED EMBODIMENTS

Figure 1:
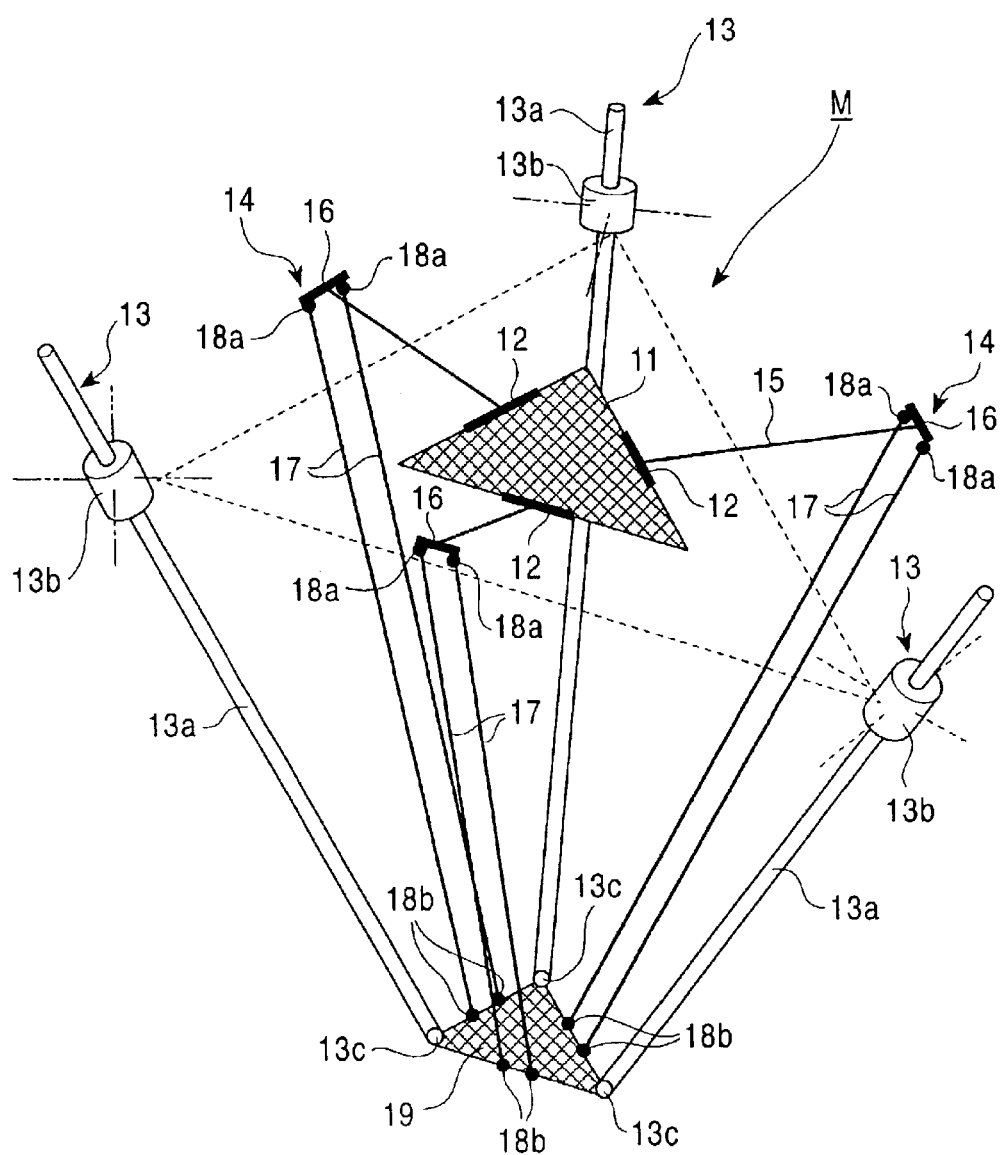
FIG. 1 is a perspective view showing the principle of configuration of a parallel link manipulator according to the present invention.

FIG. 1 shows the principle of configuration of a parallel link manipulator M according to the present invention. Three arms 14 are attached to a base section 11 used as a reference, so as to act as an auxiliary mechanism used to keep the posture of an end effecter 19 parallel with the base section 11. The end effecter 19 is supported by the leading ends of the three arms 14.

The arms 14 are attached so as to extend radially from the base section 11 in three directions at substantially equal angular intervals. Each of the arms 14 is composed of a first link section 15 consisting of a single link having one end connected to a rotating shaft 12 provided on the base section 11, and a second link section 17 consisting of a parallel link connected to the other end of the first link section 15 via another rotating shaft 16 and composed of two bars of the same length. The three rotating shafts 12 of the base section 11 are arranged in the same plane so as not be parallel with one another. The rotating shaft 16 is arranged parallel with each of the rotating shafts 12.

The second parallel link section 17 is connected to each of the rotating shaft 16, located at the upper end, and the end effecter 19, located at the lower end, using universal joints 18a, 18b such as ball joints or Cardan joints which have a degree of freedom of 2 or more. The universal joint 18b, which connects the lower end of the second link section 17 of each of the three arms 14 to the end effecter 9, is arranged in the same plane (hereinafter referred to as the "particular plane").

The parallel link manipulator M of the present invention is characterized in that at least three direct-acting driving means 13 are provided independently of the arms 14 to change the position of the end effecter 19. Each of the direct-acting driving means 13 is composed of a driving shaft 13a having a leading end which is connected to the end effecter 19 using a pivoting bearing with a degree of freedom of 2 or more and which can be advanced toward and retreated from a proximal support point, an a driving source (not shown in the drawings) that drives the driving shaft 13a so as to advance and retreat. Possible means for supporting the driving shaft 13a so as to allow it to advance and retreat is an arrangement in which, for example, a nut member 13b is provided so that a threaded portion formed in a surface of the driving shaft 13a can be screwed into the nut member 13b and in which a driving motor such as a servo motor is provided to rotationally drive the driving shaft 13a around the axis of this shaft (see FIG. 7). In this case, the nut members 13b are located on the base section 11 or in a plane parallel with the base section 11. The nut member 13b can be rotationally moved at least in two direction within the base section 11 or within the plane parallel with the base section 11. That is, the nut member 13b has a degree of freedom of 2.

As shown in FIG. 2, in the arm 14 of the parallel link manipulator M, the first link section 15 can be rotationally moved around the axis of the rotating shaft 12 of the base section 11. The first link section 15 and the second link section 17 can be rotationally moved around the axis of the rotating shaft 16 to change the angle between them. Furthermore, the second link section 17 can be rotationally moved around the pivoting bearings (universal joints) 18a, 18b relative to the rotating shift 16, located at the upper end of the manipulator, and to the end effecter 19, located at the lower end of the manipulator. Consequently, the end effecter 19 can be moved to a desired position by advancing and retreating each of the three driving shafts 13a of the direct-acting driving means 13. Then, during this position change, owing to the organizational characteristics of the parallel link section 17, the universal joint 18b, located at the lower end of the manipulator, always remains parallel with the rotating shaft 16, located at the upper end of the manipulator. Therefore, the end effecter 19, supported by the leading ends of the three arms 14, always remains parallel with the particular plane regardless of the postures of the arms 14. That is, the end effecter 19 is moved to an arbitrary position while always remaining parallel with particular plane.

In the present invention, loads imposed when the end effecter 19 performs an operation act in the axial direction of the driving shaft 13a of the direct-acting driving means 13. This prevents the driving shaft 13a from being bent or deformed when it is advanced or retreated to change the position of the end effecter 19. Therefore, accurate positional control is possible even if the end effecter 19 must handle a heavy object.

Three or more arms 14, which regulate the movement of the end effecter 19, are desirably provided taking stability into account. However, the posture of the end effecter 9 can be kept parallel with the particular plane using only two arms 14.

The means for advancing and retreating the driving shaft 13a of the direct-acting driving means 13 may be a mechanism which holds the driving shaft 13a so as to hinder it from rotating around its axis and which rotationally moves the nut member 13b. Alternatively, it is contemplated that the direct-acting actuating means may be composed of a cylinder mechanism that is driven by fluid pressure such as oil pressure, water pressure, or air pressure so as to be expanded and contracted, thus advancing and retreating the driving shaft toward and from the support point.

Figure 3:
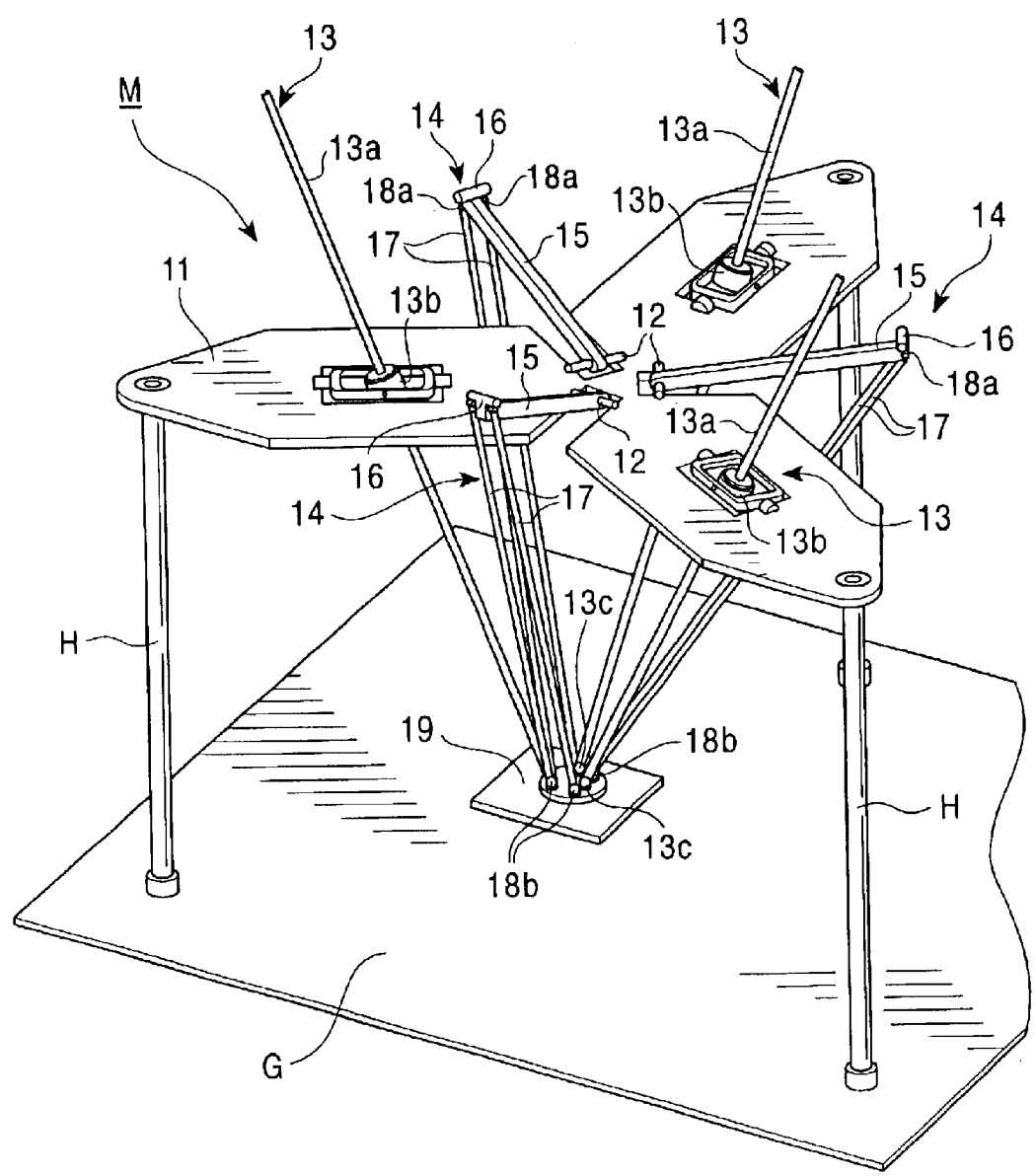
FIG. 3 is a perspective view showing an embodiment of the parallel link manipulator according to the present invention.

FIG. 3 shows an embodiment of the parallel link manipulator M according to the present invention. In the parallel link manipulator M, a vertical frame H provided on a ground G so as to extend perpendicularly to it supports the plate-like base section 11 on the ground G. The three arms 14 and the three direct-acting driving means 13 are disposed on the base section 11. The end effecter 19 is supported by the arms 14 and the lower ends of the direct-acting driving means 13.

The three arms 14 are attached so as to extend radially from the base section 11 in three directions at substantially equal angular intervals. Each of the arms 14 is composed of the first link section 15 rotationally moving around the axis of the rotating shaft 12 arranged on the base section 11, and the second link section 17 connected to the other end of the first link section 15 via another rotating shaft 16 and composed of two bars of the same length. In each of the arms 14, the rotating shaft 16 is parallel with the corresponding rotating shaft 12 on the base section 11. The second parallel link section 17 is connected to each of the rotating shaft 16, located at the upper end of the manipulator, and the end effecter 19, located at the lower end of the manipulator, using the universal joints 18a, 18b such as ball joints or Cardan joints which have a degree of freedom of 2 or more.

Figure 4:
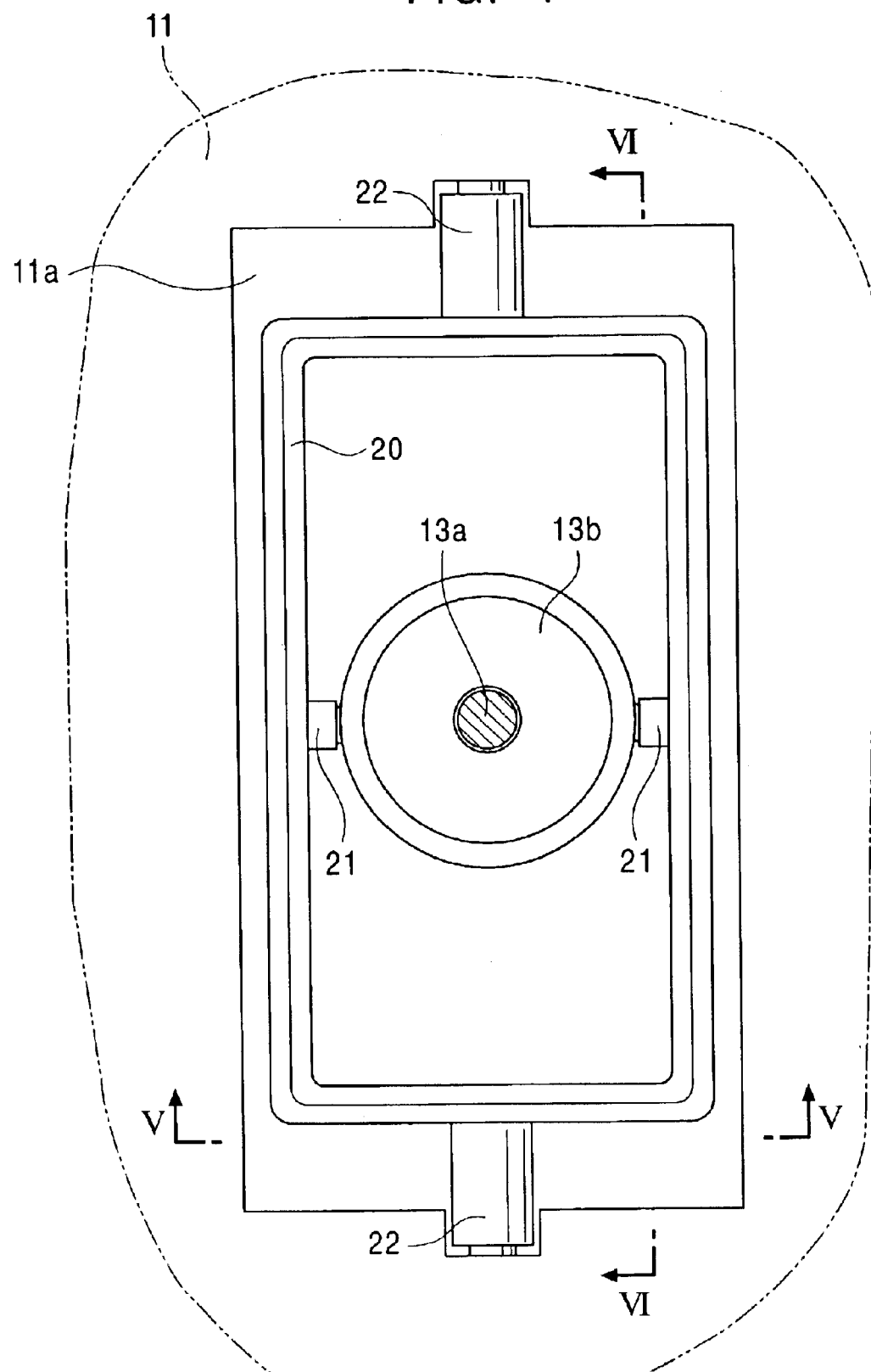
FIG. 4 is a top sectional view showing an attaching structure for a nut member, the view relating to an example of direct-acting driving means used for the parallel link manipulator according to the present invention.
Figure 5:
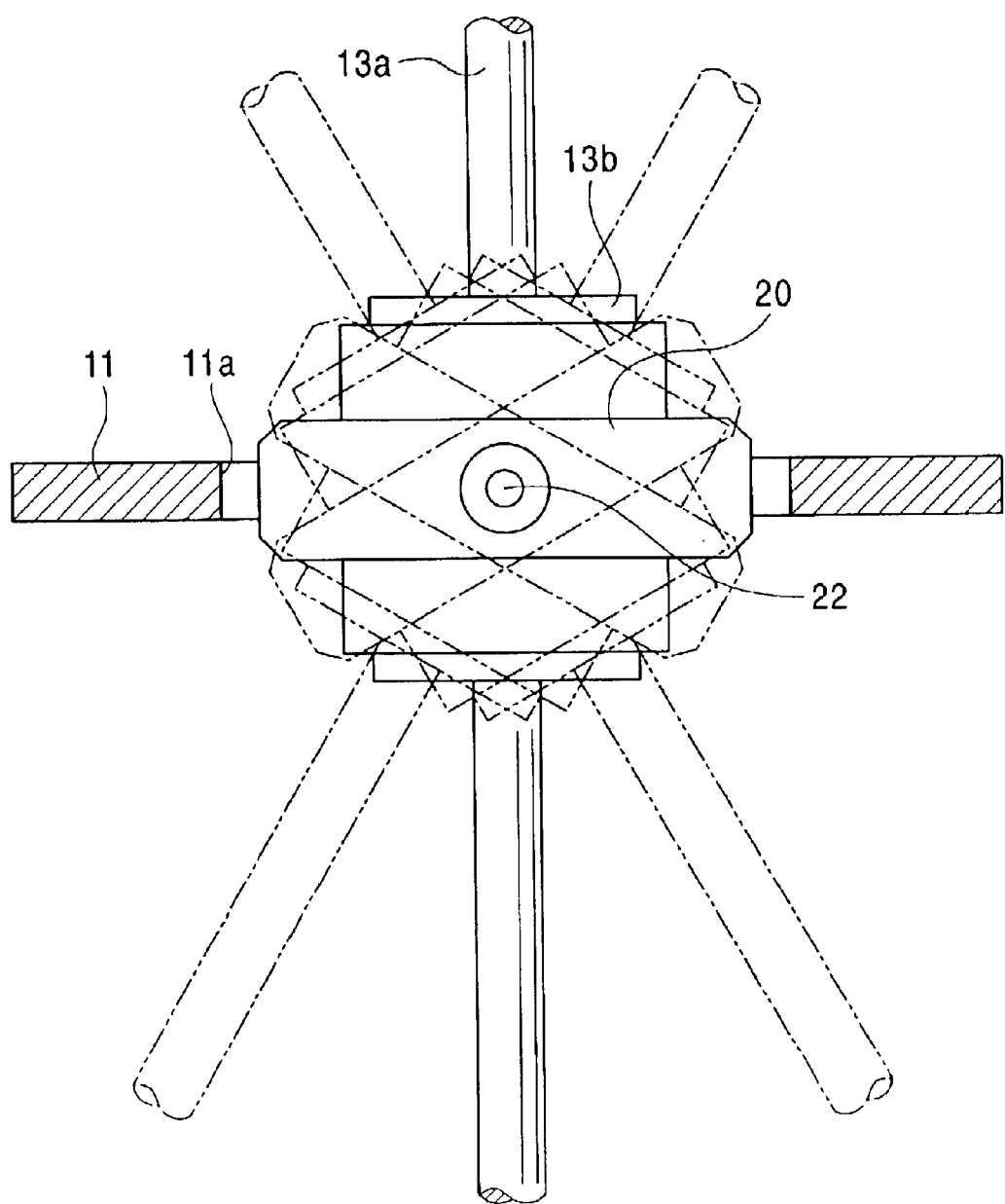
FIG. 5 is a side sectional view taken along line V—V in FIG. 4, the view relating to the example of the direct-acting driving means used for the parallel link manipulator according to the present invention.
Figure 6:
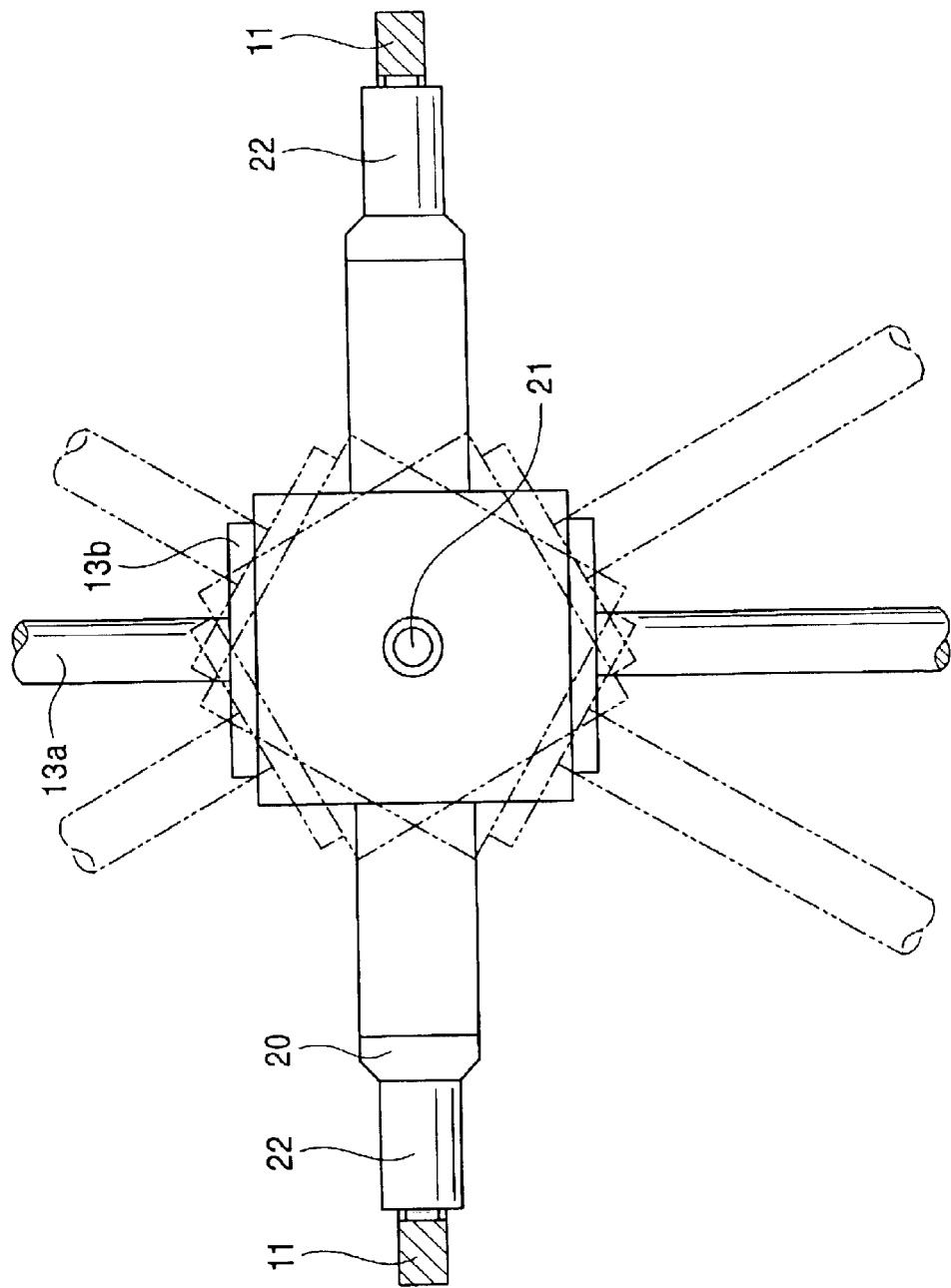
FIG. 6 is a side sectional view taken along line VI—VI in FIG. 4, the view relating to the example of the direct-acting driving means used for the parallel link manipulator according to the present invention.
Figure 7:
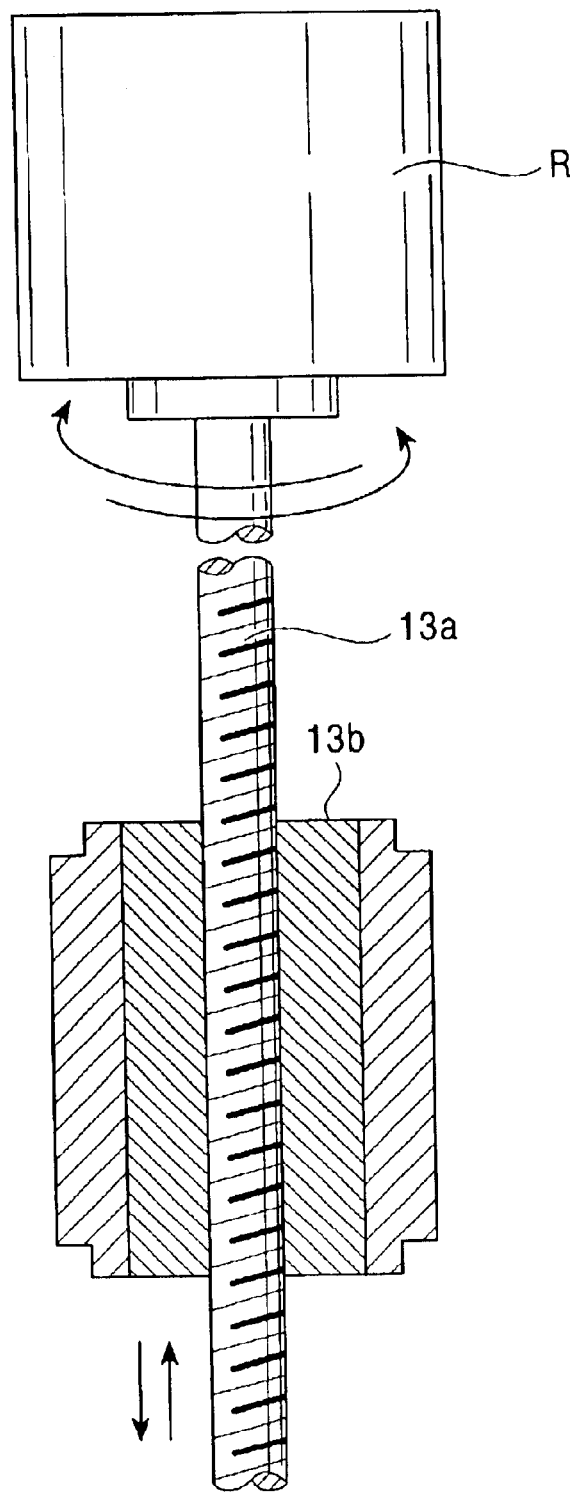
FIG. 7 is a front sectional view showing the screwing relationship between a driving shaft and the nut member, the view relating to the example of the direct-acting driving means used for the parallel link manipulator according to the present invention.

The three direct-acting driving means 13 for changing the position of the end effecter 19 is configured so that the nut member 13b disposed on the base section 11 supports the middle of the driving shaft 13a the lower end of which is connected to the end effecter 19 via the pivoting bearing 13c with a degree of freedom of 2 or more. As shown in FIG. 4, a holder 20 is mounted in an opening 11a formed in the base section 11, so as to be rotationally movable using a shaft 22. The nut member 13b is attached to the inside of the holder 20 so as to be rotationally movable using a shaft 21 extending perpendicularly to the shaft 22 of the holder 20. Thus, as shown in FIGS. 5 and 6, the nut member 13b can be rotationally moved in two directions relative to the base section 11. Further, as shown in FIG. 7, a threaded portion is formed in an appropriate area on a surface of the driving shaft 13a. The threaded portion is screwed into the nut member 13b. Furthermore, a driving source R such as a servo motor is provided to rotationally drive the driving shaft 13a around its axis. Consequently, by using the driving source R to control the amount of rotation of the driving shaft 13a, the distance the driving shaft 13a is advanced through or retreated from the nut member 13b can be adjusted to accomplish the positional control of the end effecter 19.

Figure 8:
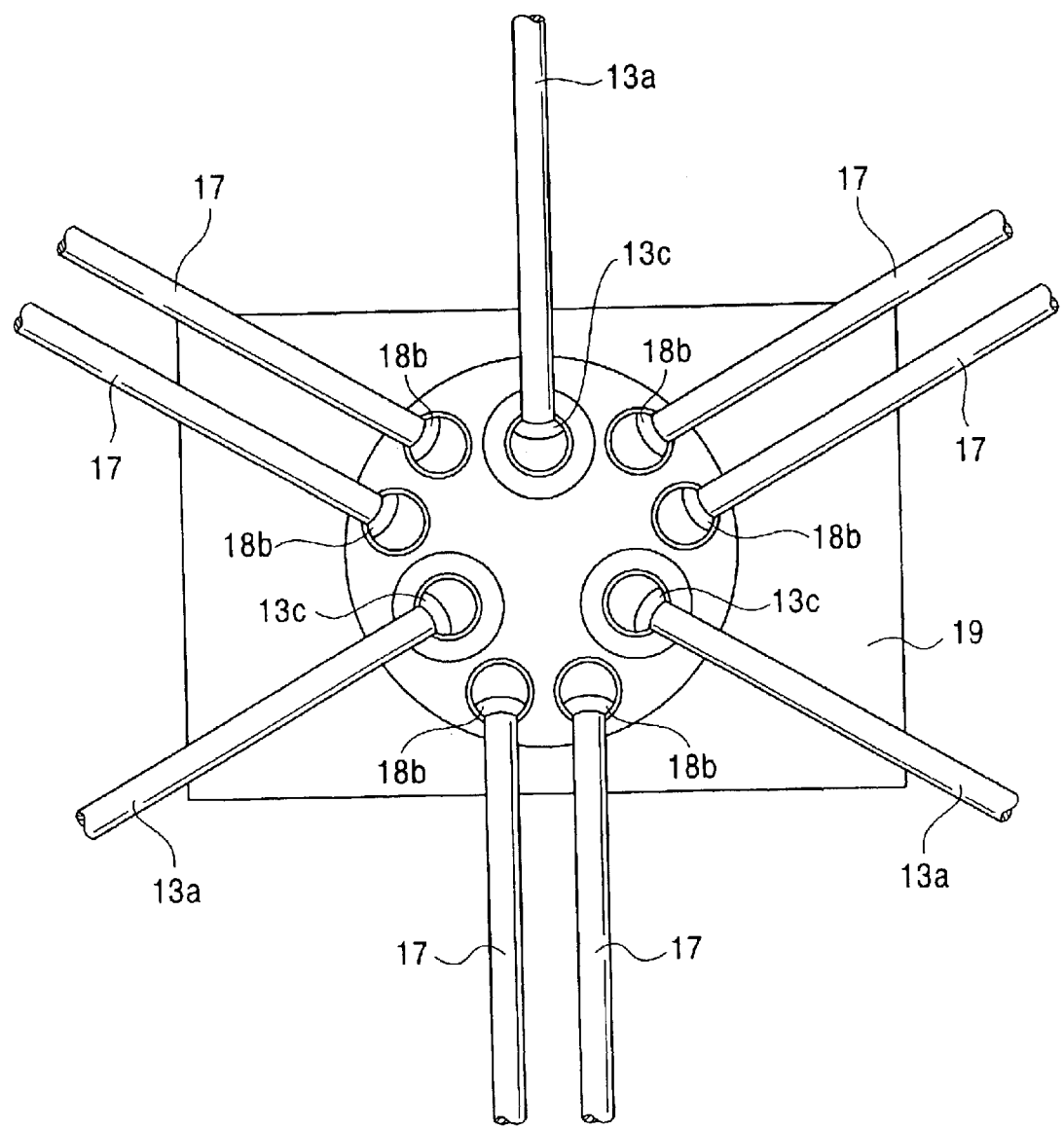
FIG. 8 is a plan view showing an example of configuration of an end effecter of the parallel link manipulator according to the present invention.

As illustrated in FIG. 8, the end effecter 19 connects to the lower ends of second link sections 17 of the three arms 14 and to the lower ends of driving shafts 13a of the direct-acting driving means 13, using the universal joints 18b, 13c, respectively so as to have a degree of freedom of 2 or more. The universal joints 18b, 13c are arranged in the same plane.

Figure 9:
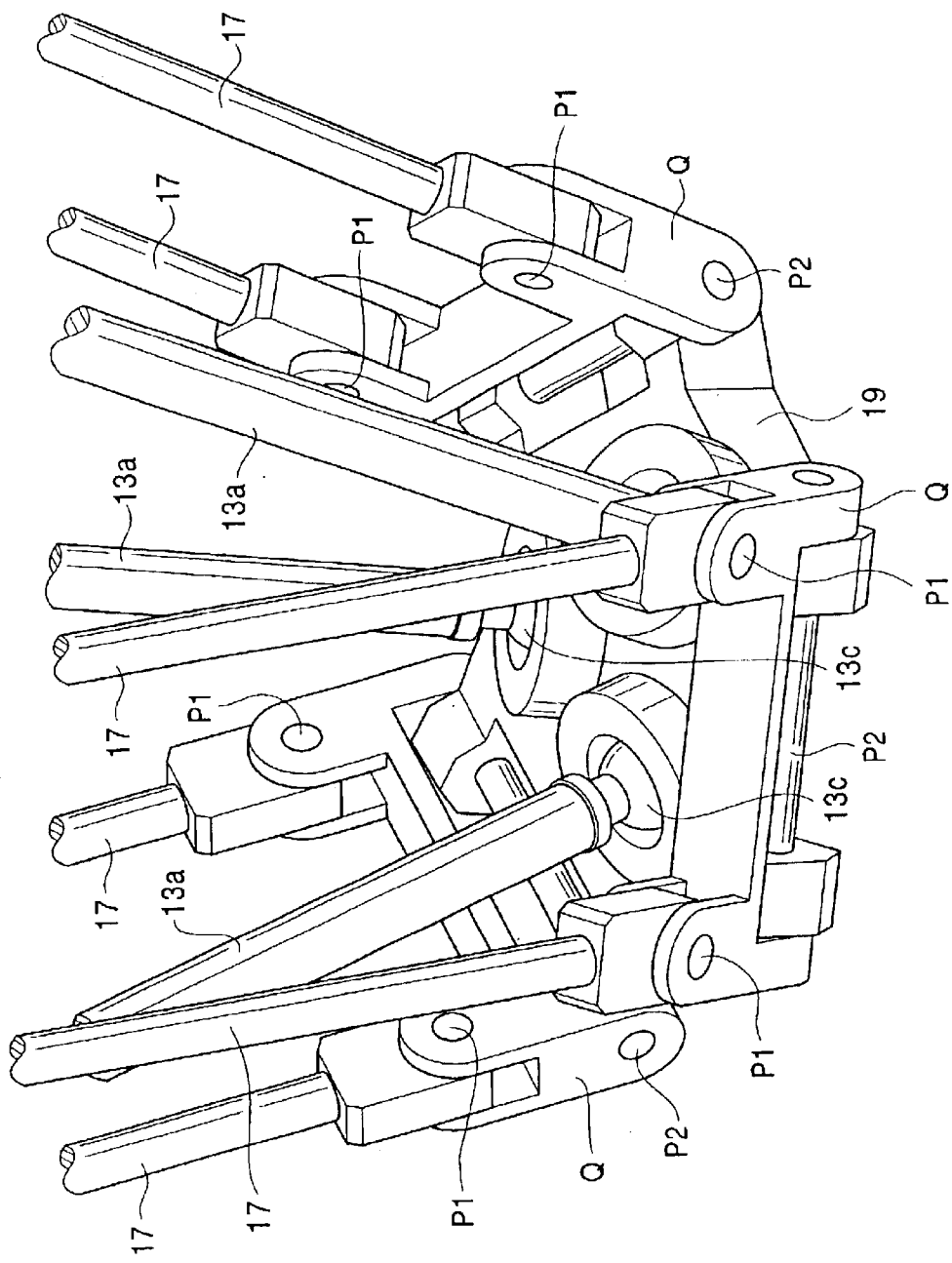
FIG. 9 is a plan view showing a different example of configuration of the end effecter of the parallel link manipulator according to the present invention.
Figure 10:
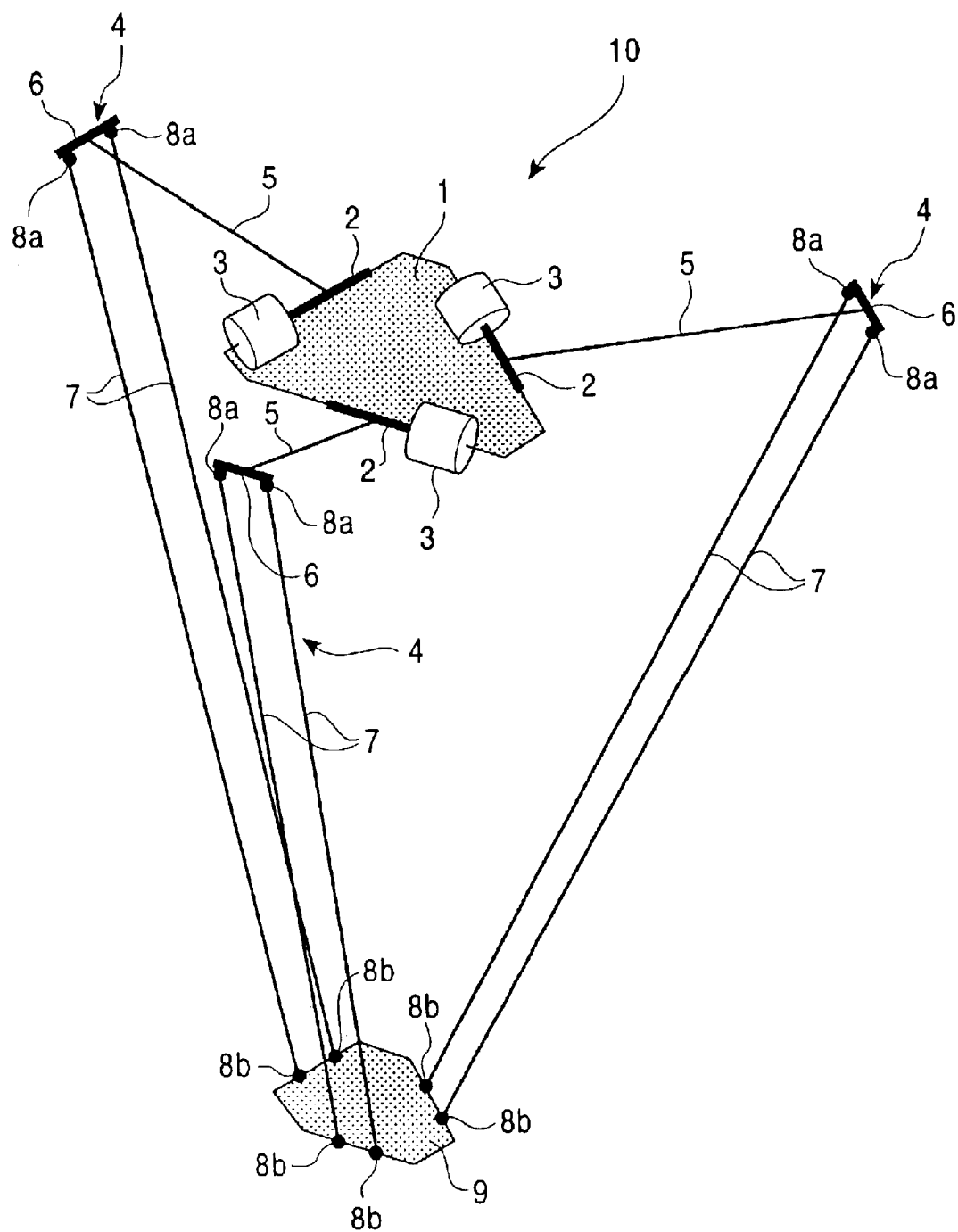
FIG. 10 is a perspective view showing the principle of configuration of a conventional manipulator.

The structure shown in FIG. 9 is another example in which the lower ends of the second link section 17 are connected to the end effecter 19 so as to have a degree of freedom of 2. That is, a joint Q is rotationally movably attached to the end effecter 19 using a pin P2. Then, the lower end of the second link section 17 is rotationally movably attached to the joint Q using a pin P1 extending in a direction orthogonal to the pin P2. Thus, the second link section 17 can be rotationally moved in two different directions relative to the end effecter 19.

In the parallel link manipulator according to the present invention, besides the arms that regulate the posture of the end effecter so that it remains parallel with the particular plane, the direct-acting driving means for controlling the position of the end effecter is independently provided so that loads on the end effecter act in the axial direction of the driving shaft of the direct-acting driving means. Accordingly, even if the end effecter performs an operation of handling a heavy object, the driving shaft of the driving means is prevented from being bent or deformed by loads. This improves the positional control of the end effecter. Moreover, the lifetime expectancy can be increased.

With reference to FIGS. 11 to 23, description will be given of a control device 102 for the parallel link manipulator of the embodiment. The control device 102 for the parallel link manipulator is composed of a forward kinematic processing section 104 used to determine estimated values Xc for task coordinate variables for the end effecter from driving joint coordinate variables qd and a control system 118 used to provide feedback control to a parallel link manipulator main body 120 according to deviations between the task coordinate variables Xc determined and target task coordinate variables Xr.

The estimated values Xc of the task coordinate variables Xe are obtained by multiplying the deviations between the driving joint coordinate variables qd and their estimated values by an inverse matrix $J^{-1}$ of a Jacobian matrix J, multiplying the products by an appropriate gain K, and then integrating the products. This is well known. Here, the inventor has found that the estimated values Xc of the task coordinate variables are also obtained by using a transposed matrix $J^T$ of the Jacobian matrix in place of the inverse matrix $J^{-1}$ of the Jacobian matrix.

Figure 11:
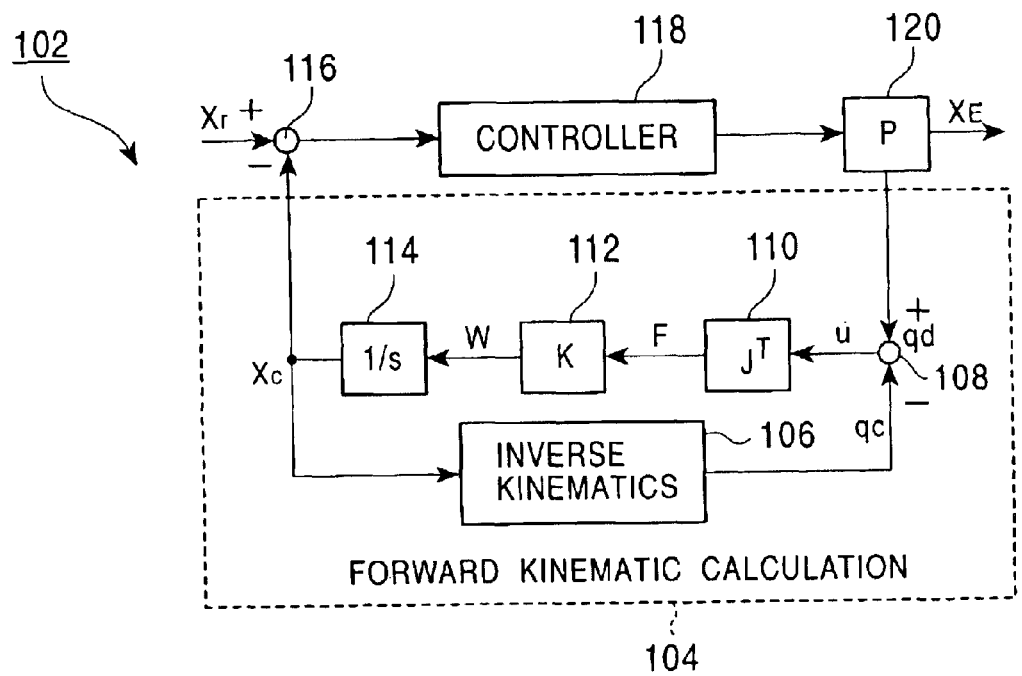
FIG. 11 is a block diagram showing a control device for the parallel link manipulator of the embodiment, the diagram focusing on a forward kinematic processing section.

In FIG. 11, 106 is an inverse kinematic processing section that converts the estimated values Xc for the task coordinate variables into estimated values qc for the driving joint coordinate variables and then outputting the converted estimated values. A subtractor 108 finds differences between these estimated values and actual driving joint coordinate variables qd determined by an encoder or the like. A Jacobian transposed matrix processing section 110 multiplies the differences by the transposed matrix $J^T$ of the Jacobian matrix. A gain processing section 112 multiplies the products obtained by the Jacobian transposed matrix processing section 110, by a constant or the K. An integrator 114 integrates the products obtained by the gain processing section 112 to obtain the estimated values Xc (estimated values for the coordinate variables for the end effecter) for the task coordinate variables.

The forward kinematic processing section 104 is considered to provide feedback control to a virtual parallel link manipulator so as to match the estimated values qc for the driving joint coordinate variables to the actual driving joint coordinate variables qd. An output u from the subtractor 108 corresponds to deviations in terms of driving joint coordinates. An output F obtained after multiplying the deviations by the transposed matrix of the Jacobian matrix corresponds to virtual force or moment applied to the end effecter. A virtual position of the end effecter is determined by multiplying the output F by the gain and then integrating the products obtained. The forward kinematic processing section 104 inputs appropriate values as initial estimated values Xc for the task coordinate variables. Then, inverse kinematic calculation is carried out to convert these estimated values into estimated values for the driving joint coordinate variables. According to the deviations between the estimated values obtained and the actual driving joint coordinate variables, the estimated values are multiplied by the transposed matrix of the Jacobian matrix (hereinafter referred to as the "Jacobian transposed matrix"). Thus, the force or moment F applied to the virtual end effecter is found and then multiplied by the gain. The products obtained are then converted into virtual controlled variables W. The controlled variables W are then integrated to update the estimated values Xc for the task coordinate variables.

In general, when the task coordinate variables for the end effecter are defined as XE and the driving joint coordinate variables are defined as q, the relationship q=f(XE) holds water. This relationship is temporally integrated to obtain Equation (1):

$$q' = JXE', \quad J = \partial f / \partial XE \tag{1}$$

where (') denotes a differential symbol or a difference for implementation. In this case, a matrix J is called a "Jacobian matrix" that is square. However, the elements of this matrix are not constants but functions of the task coordinate variables XE. Further, the term "coordinates" or "coordinate variables" as used herein do not refer to simple three-dimensional coordinates but to a general vector quantity. For example, the task coordinate variables mean a set of variables that identify the position and posture of the end effecter. The driving joint coordinate variables q mean a vector composed of a set of variables that can specify the state of a plurality of driving joints. Furthermore, in Equation (1), the point beyond which the Jacobian matrix J is not regular is called a "singular point".

When the force or moment applied to the end effecter is defined as F and the driving force applied to each joint is defined as u, the following equation is established:

$$F = J^T(XE)u \tag{2}$$

Here, it is assumed that the forward kinematic processing section 104 in FIG. 11 enables control inputs W to control speeds X'c for the estimated value for the task coordinate variables as indicated by Equation (3). Then, the estimated values for the task coordinate values are obtained by integrating the values X'c.

$$X'c = W \tag{3}$$

Then, the following lemma holds water:

Lemma

The control inputs W are determined according to Equation (4).

$$W = -KJ(Xc)^T(qc - qd) \tag{4}$$

Then, it is assumed that Equation (5) is established for certain positive numbers N and c.

$$N < \sigma n(J(Xc) \cdot J(Xc)^T), \quad \|q'd\| < c \tag{5}$$

Then, a certain $T \geq 0$ is present for an arbitrary $\epsilon 0 > 0$ and K in $K > C/(\epsilon 0 \cdot N)$. Thus, Equation (6) is established.

$$\|qc - qd\| < \epsilon 0, \text{ (for all } t \geq T) \tag{6}$$

In this case, σn denotes the minimum singular solution. Equation (6) means that the estimated values for the driving joint coordinate variables converge to the actual driving joint coordinates by moving the virtual end effecter for a time T or longer, while providing control inputs to the virtual end effecter according to Equation (4). In this case, provided that the forward kinematic processing section 104 can be assumed to express the same mechanism as that of the actual parallel link manipulator, i.e. provided that the Jacobian matrix J and the inverse kinematic processing section 106 express the actual parallel link manipulator, the estimated values Xc for the task coordinate variables for the end effecter are a solution of q=f(XE).

In FIG. 11, 116 denotes a subtractor that determines deviations between the target values Xr for the task coordinate variables and the estimated values Xc for the task coordinate variables. The control system 118 applies PD control or PDI control to these deviations to generate controlled variables (control inputs), thus driving the parallel link manipulator main body 120. Table 1 shows the symbols used in the embodiments.

Meanings of Symbols

---

XE  Task coordinate variables (coordinates of end effecter)
Xc  Estimated values for task coordinate variables (estimated coordinates of end effecter)
Xr  Target task coordinate variables (target coordinates of end effecter)
qd  Driving joint coordinate variables
qc  Estimated values for driving joint coordinate variables
θ1 to θ3 Length of ball screw
'   Differential symbol

---

Figure 12:
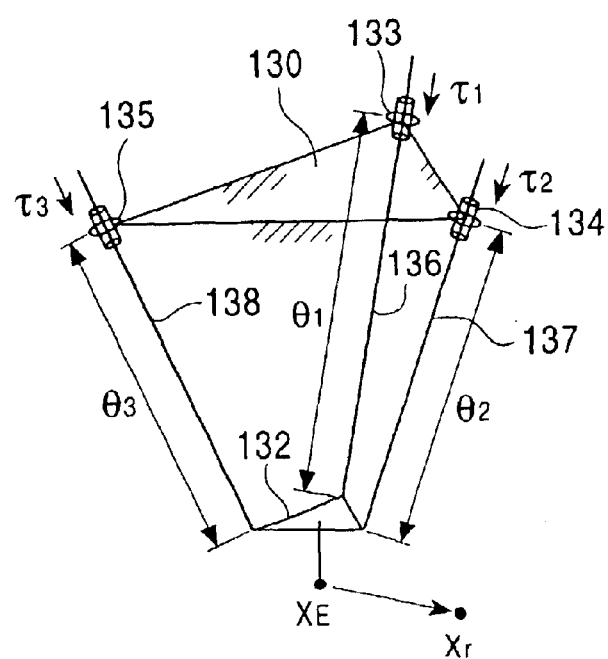
FIG. 12 is a schematic diagram showing the parallel link manipulator used in the embodiment.

To verify the validity of estimation of the task coordinate variables X carried out by the forward kinematic processing section in FIG. 11, simulation was executed using the parallel link manipulator in FIG. 12 as a model. The parallel link manipulator is obtained by modeling the parallel link manipulator shown in FIG. 21. An end effecter 132 is attached to a fixed base 130 via driven joints so as to maintain a constant posture. 133 to 135 denote servo motors, examples of driving joints. 136 to 138 denote ball screws.

The lengths of the ball screws 136 to 138 between the servo motors 133 to 135, respectively, and the end effecter 132 are denoted as θ1 to θ3. Further, the servo motors 133 to 135 are supported on the fixed base 130 using joints with a degree of freedom of pivoting of 2 or more. The leading ends of the ball screws 136 to 138 are supported on the end effecters so as to have a degree of freedom of pivoting of 2 or more.

Since the posture of the end effecter 132 is constrained, the degree of freedom is represented by three coordinates X, Y, and Z. The central position of the end effecter moves as shown by the broken lines in FIGS. 13 to 15. The lengths θ1 to θ3 of the three ball screws vary as indicated by Equation (7).

Figure 13:
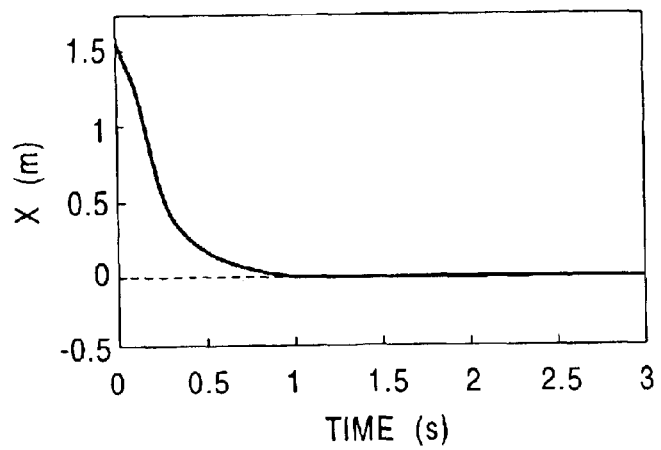
FIG. 13 is a graph showing the results of simulation of a task coordinate variable X using the forward kinematic processing section in FIG. 11.
Figure 14:
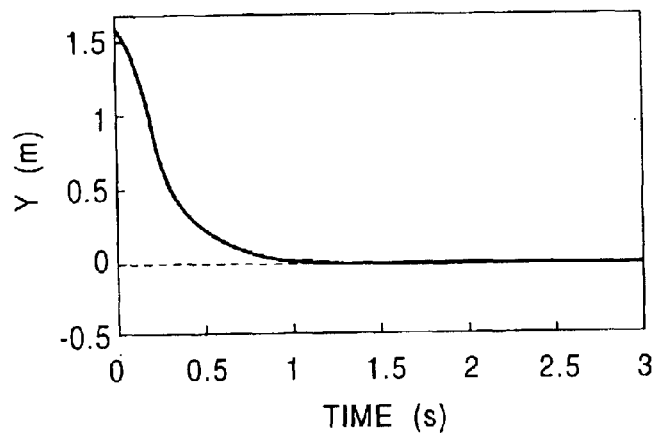
FIG. 14 is a graph showing the results of simulation of a task coordinate variable Y using the forward kinematic processing section in FIG. 11.
Figure 15:
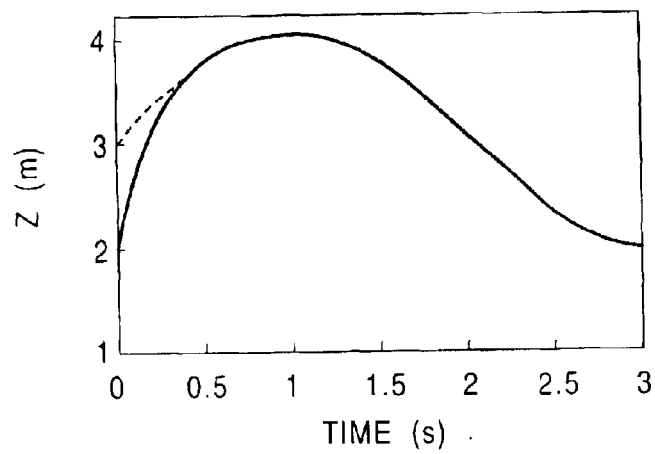
FIG. 15 is a graph showing the results of simulation of a task coordinate variable Z using the forward kinematic processing section in FIG. 11.

The initial central position (the position at time 0 shown by the solid line) of the end effecter 132 was appropriately estimated and set at, for example, (1, 1, 1). Then, the forward kinematic processing section 104 in FIG. 11 was used to simulate the position of the end effecter 132. The results are shown in FIGS. 13 to 15, wherein the solid lines indicate the estimated values for the coordinates of the end effecter. In this simulation, the gain K was 50. As is apparent from FIGS. 13 to 15, the estimated values for the coordinate variables for the end effecter converged to the actual values in about one second. Subsequently, the position of the end effecter could be determined in real time.

$$\theta 1 = \sin \pi/2t + \sqrt{10}$$
$$\theta 2 = \sin \pi/2t + \sqrt{10}, K=50 \quad (7)$$
$$\theta 3 = \sin \pi/2t + \sqrt{10}$$

As described above, using the forward kinematic processing section 104 in FIG. 11, the task coordinate variables for the end effecter can be estimated using the transposed matrix $J^T$ f the Jacobian matrix instead of the inverse matrix $J^{-1}$ of the Jacobian matrix. Thus, provided that these values can be estimated, the end effecter can be moved to a target position or along a target locus by using the control system to provide such feedback control as eliminates the differences between the task coordinate variables and the target values Xr.

Figure 16:
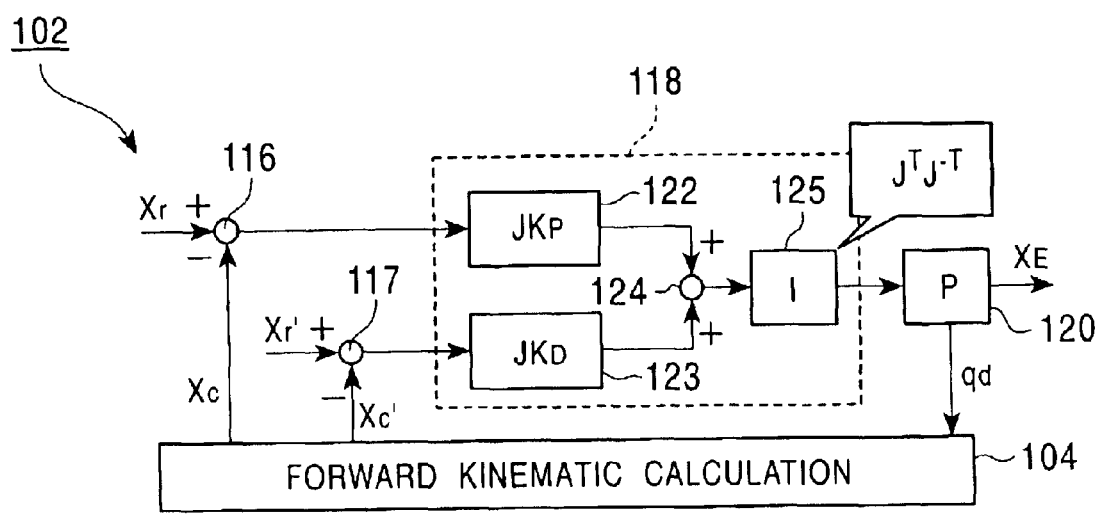
FIG. 16 is a block diagram showing a control system for the control device for the parallel link manipulator of the embodiment.

FIG. 16 shows the control system 118 in the control device 102 for the parallel link manipulator. In this case, the control system 118 executes PD control. Accordingly, the inputs are the target coordinate variables Xr and their differential values Xr' as well as the estimated values Xc for the task coordinate variables and their differential values Xc'. PID control may be used instead of the PD control. The manner of control is arbitrary.

According to kinematics, the controlled variables are obtained by multiplying displacements between Xr and Xc by a gain KP and multiplying the products obtained by the inverse matrix $J^{-T}$ of the Jacobian transposed matrix. However, the use of the $J^{-T}$ requires calculations the amount of which is equivalent to that required to determine the inverse matrix $J^{-1}$ of the Jacobian matrix. Thus, this method involves heavy processing burdens. The inventor has thus found that $J^{-T} \cdot J^T$ can be made an identity conversion I by using $J \cdot KP \cdot J^T$ or $J \cdot KD \cdot J^T$ instead of the gain KP or gain KD and that the processing can be accomplished simply by executing multiplication using J·KP or J·KD. The gain KP and KD are matrices but may be constants.

he control system 118 in FIG. 16 is based on this concept. Subtractors 116 and 117 determine differences the target coordinate variables Xr and the estimated values Xc for the task coordinate variables or differences between the differential values Xr' for the target coordinate variables and the differential values Xc' for the estimated task coordinate variables. Then, a proportional control section 122 executes the multiplication J·KP, and a differential control section 123 executes the multiplication J·KD. An adder 124 then adds these controlled variables together. An identity converting section 125 then subjects these variables to identity conversion to control the parallel link manipulator main body 120. The identity converting section 125 is not required for implementation.

Such control may be provided partly because the gains KP and KD are basically regular matrices, so that even after being multiplied by the Jacobian matrix J and its transposed matrix $J^T$ from their opposite sides, they are still regular matrices with their basic nature remaining unchanged.

Figure 17:
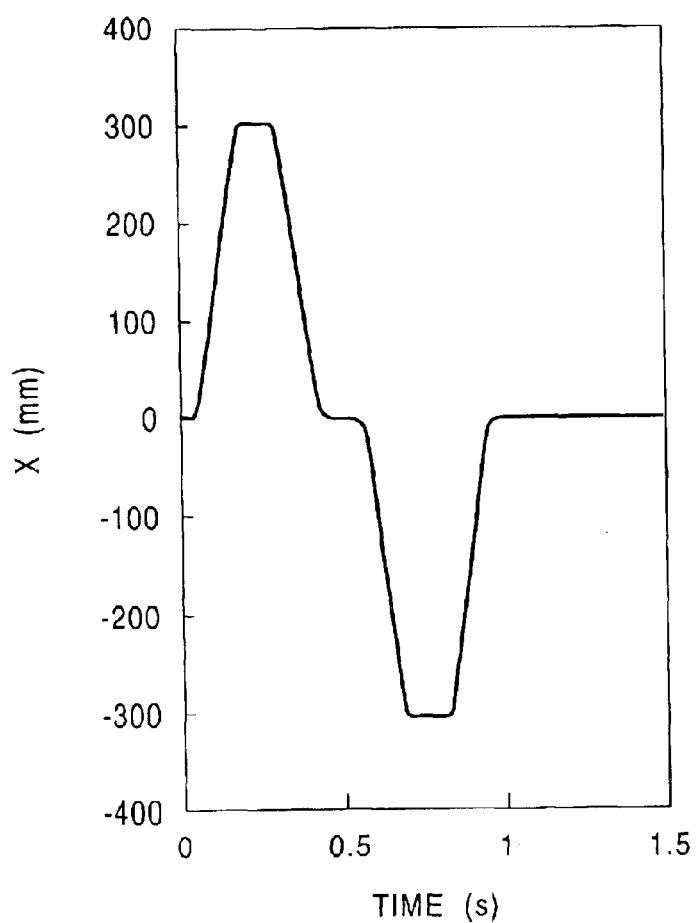
FIG. 17 is a graph showing, for the task coordinate variable X, the results of simulation of movement control of the parallel link manipulator in the embodiment.
Figure 18:
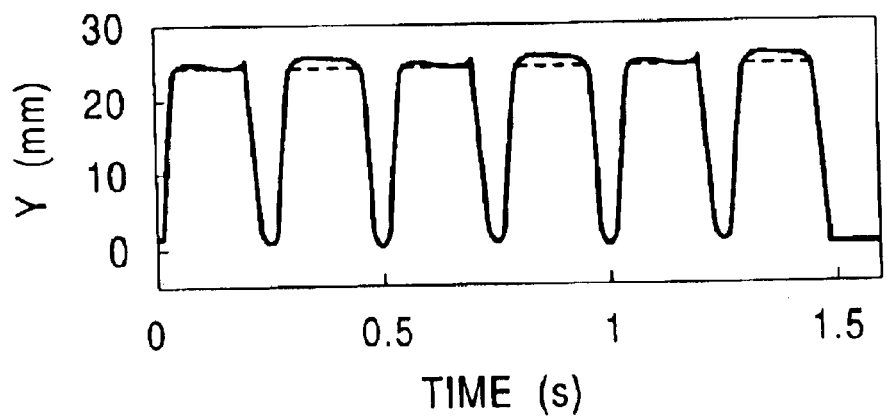
FIG. 18 is a graph showing, for the task coordinate variable Y, the results of simulation of movement control of the parallel link manipulator in the embodiment.
Figure 19:
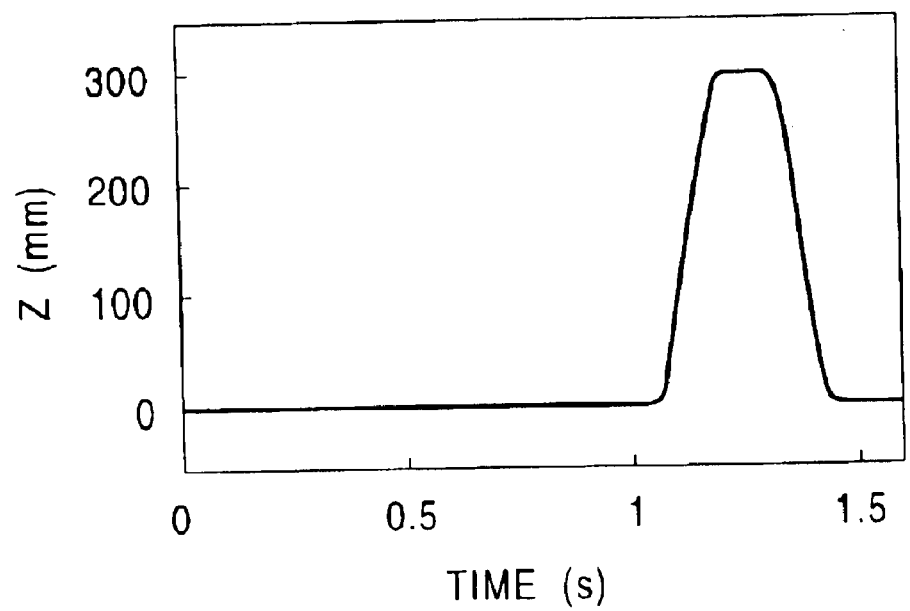
FIG. 19 is a graph showing, for the task coordinate variable Z, the results of simulation of movement control of the parallel link manipulator in the embodiment.

The results of control by the control system 118 in FIG. 16 were simulated by setting the value K at 50,000, the value KP at 200, and the value KD at 50 and using the model in FIG. 12. The results of the simulation are shown in FIGS. 17 to 19. In the figures, the broken line indicates a target locus, and the solid lines indicate the results of the simulation. In this simulation, at a time 0, the position on the target track coincides with the estimated values for the task coordinate variables. As is apparent from FIGS. 17 to 19, control is properly carried out so as to follow the target track except for a slight error in the Y coordinate. Thus, the parallel link manipulator main body 120 can be stably controlled using the control system 118 in FIG. 16.

Figure 20:
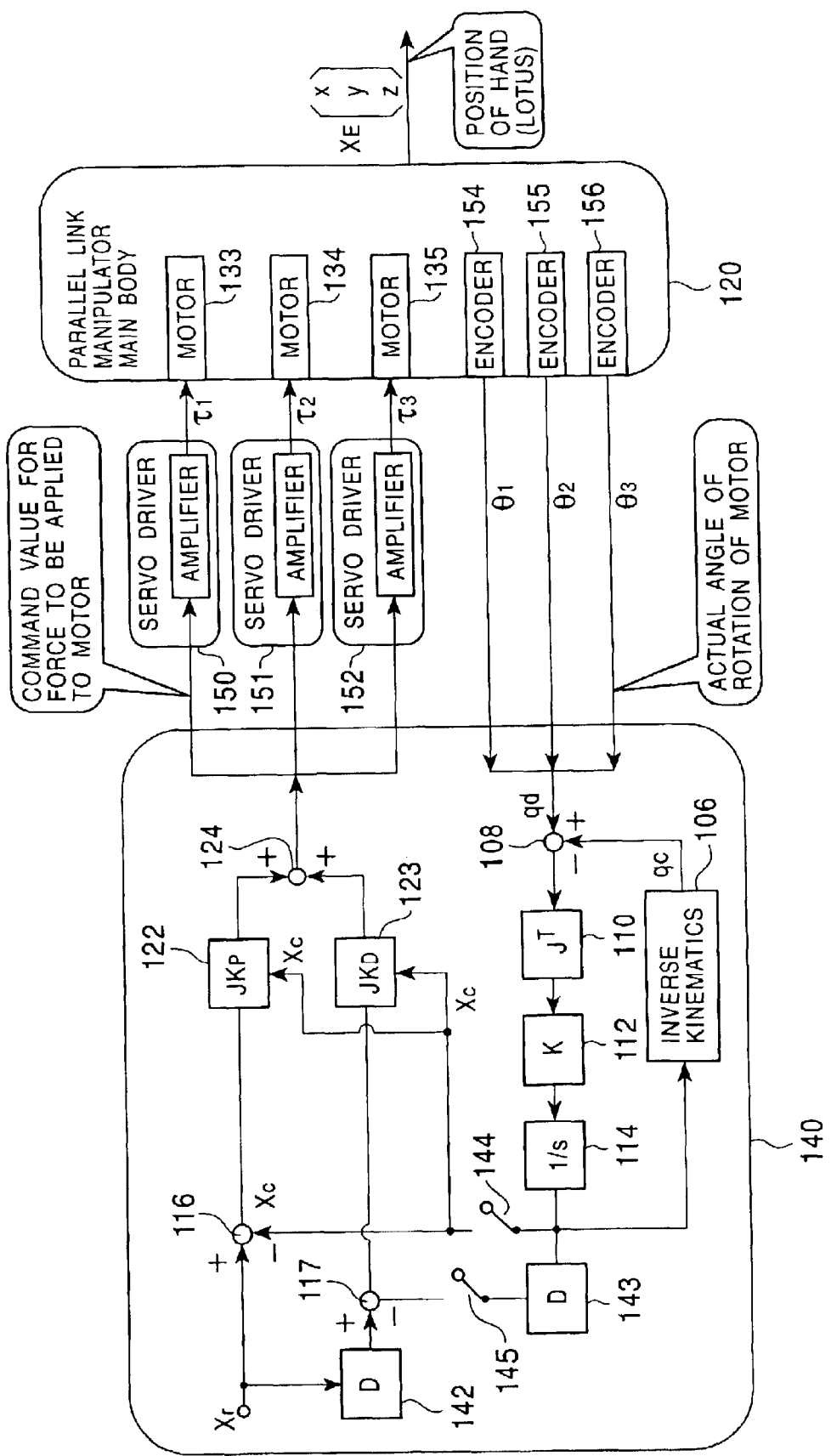
FIG. 20 is a block diagram showing a configuration of the entire control device for the parallel link manipulator of the embodiment.

FIG. 20 shows a control device 140 for the parallel link manipulator. This control device differs from the control device 102 in FIGS. 11 and 16 in that differentiators 142, 144 used to obtain differential signals are explicitly present and switches 144, 145 are explicitly present which are used to wait for control to start or to execute open loop control, until the forward kinematic processing section 104 completely converge the estimated values for the task coordinate variables. An output from the adder 124 is applied to each servo driver amplifier 150 to 152 used to drive a corresponding servo motor 133 to 135. Outputs τ1 to τ3 from the servo driver amplifiers 150 to 152 are applied to the corresponding servo motors. The positions of the ball screws, the actual angles of rotation of the motors, or their accumulated values, all of which are associated with the rotations of the motors 133 to 135, are fed back to the control device 140 as components θ1 to θ3 of the driving joint coordinate variables qd.

The advantages of the control with the task coordinate variable system will be shown below. If control is provided using a joint coordinate system, differences from the target values for the respective joints, i.e. control errors are accumulated to hinder compensation for differences from the target values for the end effecter based on the task coordinate system. In contrast, if control is provided using the task coordinate system, differences from the target values for the end effecter can be directly fed back. This avoids accumulating errors in the respective joints, thus enabling the movement of the end effecter to be precisely controlled.

Figure 21:
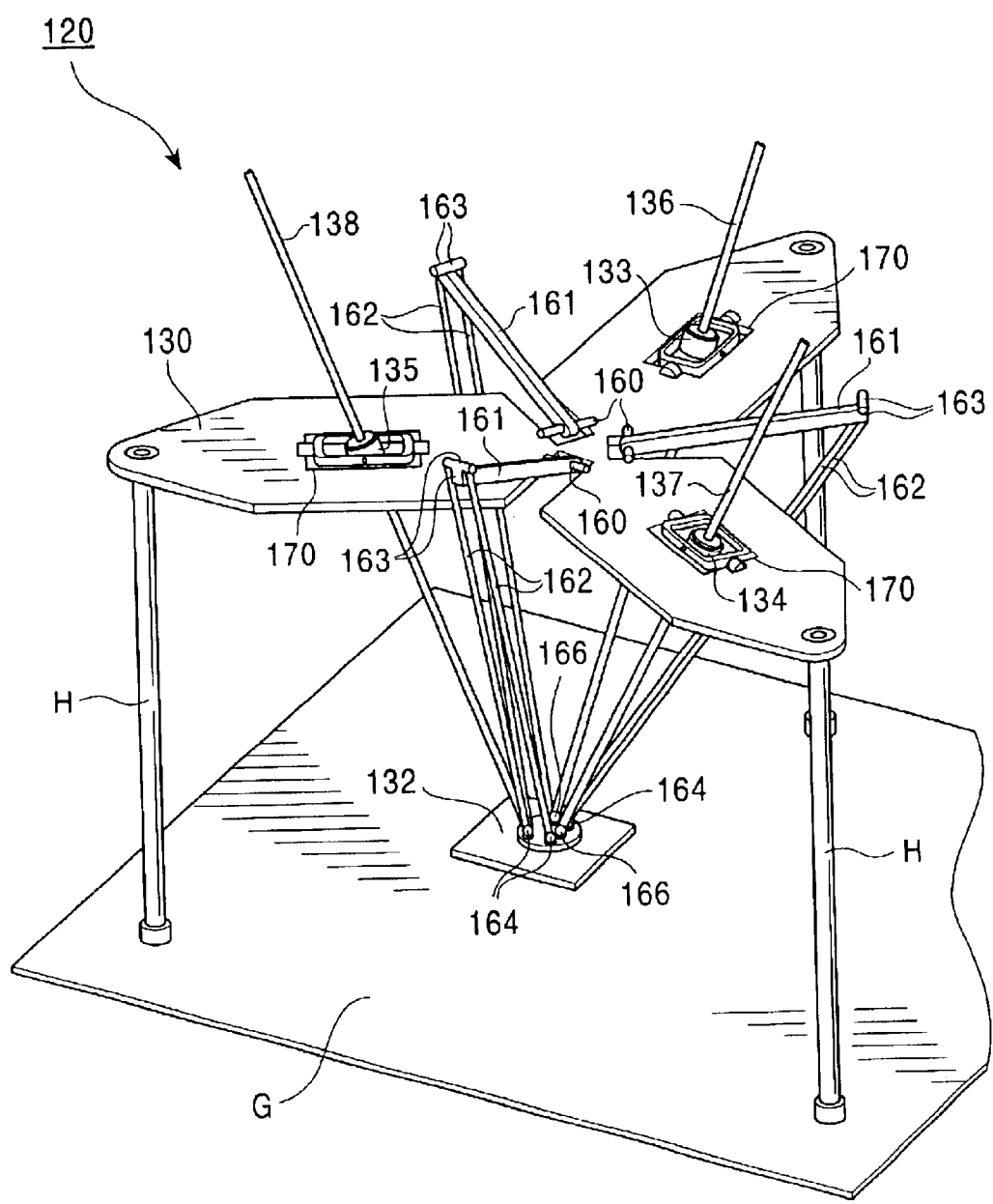
FIG. 21 is a perspective view of the parallel link manipulator used in the embodiment.

FIG. 21 shows an example of the parallel link manipulator to be controlled by the control device 140 of the embodiment. G denotes a ground, and H denotes, for example, three struts to which the fixed base 130 is fixed. Rotating shafts 160 are attached to, for example, a surface of the fixed base 130 so as to extend parallel with this surface. A first link 161 is connected to each of the rotating shafts 160. A second link 162 is pivotally attached to the other end of the first link 161 via a joint 164 with a degree of freedom of 2 or more. The rotating shafts 160 ad joints 163, 164 are driven joints. The joints 163, 164 are not limited to the degree of freedom of 2 but may have a degree of freedom of at least 2. 166 denotes joints used to attach the leading ends of the ball screws 136 to 138 to the end effecter 132. The ball screws are attached to these joints so as to pivot freely with a degree of freedom of 2 or more.

Figure 22:
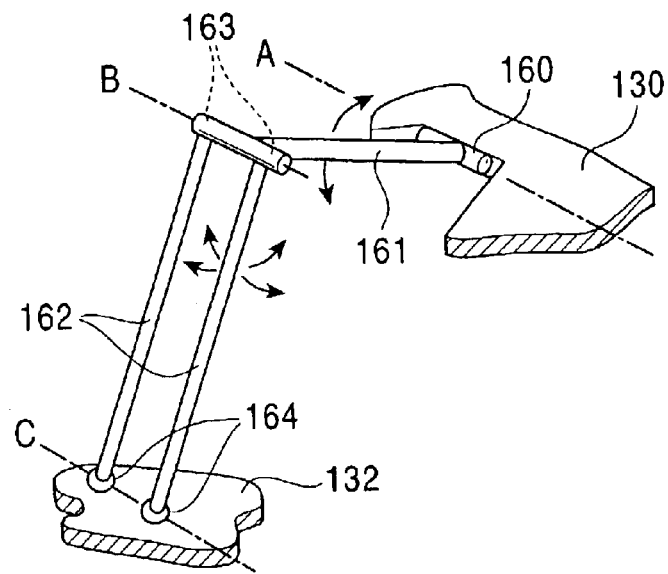
FIG. 22 is a perspective view showing a mechanism that maintains the posture of an end effecter relative to a fixed base in the parallel link manipulator in FIG. 21.

As shown in FIG. 22, each rotating shaft 160 is parallel with the surface of the fixed base 130. The straight line joining the joints 163, 163 together is also parallel with the surface of the fixed base 130. As a result, the straight line joining the joints 164, 164 is also parallel with the surface of the fixed based 30. The end effecter 132 constantly assumes a posture parallel with the fixed base 130 because the three straight lines joining the joints 164 at the leading ends of the second links 162 together are all parallel with the fixed base 130. As a result, the surface of the end effecter 132 is constantly parallel with the surface of the fixed base 130. This is convenient in carrying semiconductor wafers or liquid crystal substrates, which are sensitive to the posture of the manipulator, or performing working, assembling, or another operation with the exact posture. In this regard, an appropriate hand or the like is attached to the end effecter 132.

Figure 23:
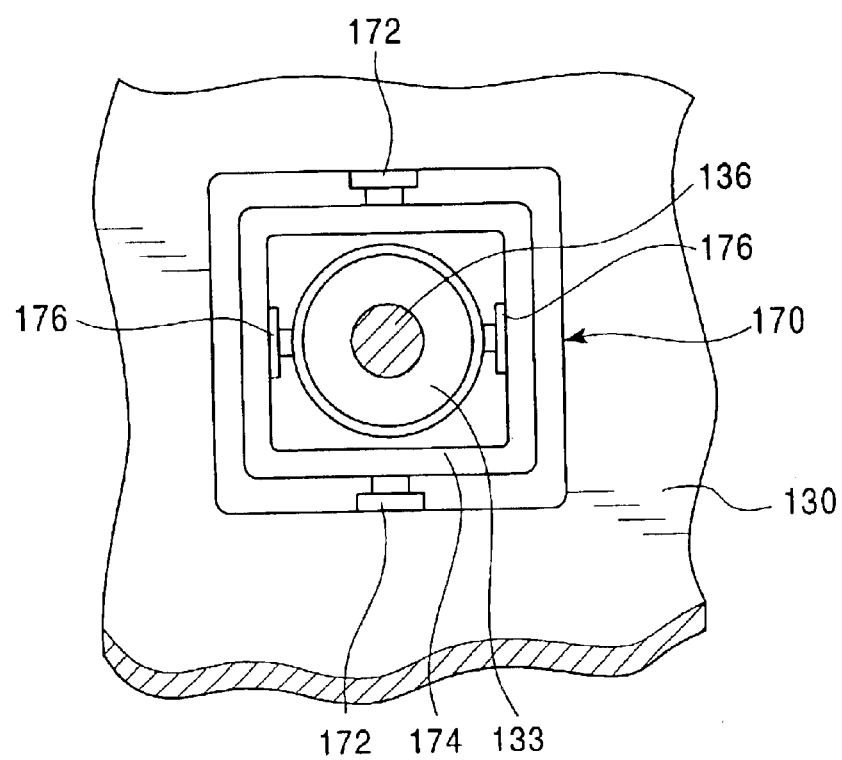
FIG. 23 is a view showing a degree of freedom of the posture of a ball screw driving servo motor of the parallel link manipulator in FIG. 21.

The position of the end effecter 132 is determined by expanding and contracting the ball screws 136 to 138. The servo motors 133 to 135 can pivot in two axial directions relative to the surface of the fixed base 130 as shown in FIG. 23. An intermediate member 174 is attached to the fixed base 130 via rotating shafts 172, 172. The servo motor 133 is attached to the intermediate member 174 via rotating shafts 176, 176. As a result, the servo motor 133 can pivot freely relative to the fixed base 130 with a degree of freedom of 2. The other servo motors 134, 135 are similarly attached.

In the parallel link manipulator main body 120 in FIG. 21, the end effecter 132 maintains a constant posture and has its position adjusted using the ball screws 136 to 138. Further, the parallel link manipulator main body 120 uses the linearly moving (direct acting) driving joints. Consequently, the parallel link manipulator main body 120 can be rigidly and accurately moved at high speed. Therefore, the end effecter can move fast, rigidly, and accurately. It is possible to use hydraulic or pneumatic cylinders or rods expanded and contracted using a linear motor, instead of the ball screws 136 to 138.

In the embodiment, the control of the particular parallel link manipulator main body 120 has been described by way of example. However, since the present invention eliminates the needs for calculations for the inverse matrix $J^{-T}$ of the Jacobian matrix, the inverse matrix $J^{-T}$ of the Jacobian transposed matrix, and the like, it is possible to easily control a parallel link manipulator that is more complicated and has more driving joints.

What is claimed is:

1. A parallel link manipulator having an auxiliary mechanism configured to always keep a posture of an end effecter parallel with a particular plane, the manipulator being characterized by being provided with at least three direct-acting driving means composed of a driving shaft having a supported proximal side and a leading side connected to the end effecter using a pivoting bearing with a degree of freedom of 2 or more, and a driving source which advances and retreats the driving shaft toward and from a proximal support point.

2. A parallel link manipulator according to claim 1, characterized in that the auxiliary mechanism used to always keep the posture of the end effecter parallel with the particular plane is provided with at least two arms each composed of a first link section having one end attached to a rotating shaft installed on a base section and having a degree of freedom of 1 and a second link member composed of two or more parallel link members each having opposite ends connected to the other end of the first link section and to the end effecter, respectively, using pivoting bearings with a degree of freedom of 2 or more.

3. A parallel link manipulator according to claim 1 or claim 2, characterized in that the direct-acting driving means is configured to advance and retreat the driving shaft through and from a nut member by using said driving source to rotationally drive said driving shaft or nut member, the nut member being attached to the base section using the pivoting bearing with a degree of freedom of 2 or more, the nut member being screwed in a threaded portion formed in a surface of the driving shaft.

4. A parallel link manipulator according to claim 1 or claim 2, characterized in that the direct-acting driving means is composed of a cylinder mechanism having opposite ends connected to the end effecter and to the base section, respectively, using the pivoting bearings with a degree of freedom of 2 or more, the cylinder mechanism being driven by fluid pressure so as to be expanded and contracted.

5. A control device for a parallel link manipulator which moves an end effecter using a plurality of driving joints and a plurality of driven joints, the control device comprising inverse kinematic converting means for converting estimated values for task coordinate variables for the end effecter into estimated values for driving joint coordinate variables, forward kinematic converting means for updating the estimated values for the task coordinate variables so as to avoid deviations between the estimated driving joint coordinate variables and actual driving joint coordinate variables, and control means for providing feedback control to the driving joints so as to match target task coordinate variables with the estimated values for the task coordinate variables, the control device being characterized in that said forward kinematic converting means updates the estimated values for the task coordinate variables by multiplying said deviations by a transposed matrix of a Jacobian matrix and a gain integrating products obtained, the transposed matrix being used to convert a differentiation of the task coordinate variables into a differentiation of the driving joint coordinate variables.

6. A control device for a parallel link manipulator according to claim 5, characterized in that said control means multiplies the deviations between the target task coordinate variables and the estimated values of the task coordinate variables by said Jacobian matrix and gain to determine controlled variables for the driving joints.

7. A control device for a parallel link manipulator according to claim 5 or claim 6, characterized in that a parallel link manipulator to be controlled is composed of a mechanism for maintaining a constant posture of the end effecter relative to a fixed base and a direct acting mechanism for changing a position of the end effecter, the direct acting mechanism being controlled as driving joints.

* * * * *